(12) United States Patent
Dimmick et al.

(10) Patent No.: US 7,409,133 B2
(45) Date of Patent: Aug. 5, 2008

(54) CAPILLARY WAVEGUIDE TUNABLE OPTICAL DEVICE

(75) Inventors: Timothy E. Dimmick, Oviedo, FL (US); Kevin H. Smith, West Melbourne, FL (US); Douglas J. Markos, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/538,947

(22) Filed: Oct. 5, 2006

(65) Prior Publication Data

US 2008/0085087 A1    Apr. 10, 2008

(51) Int. Cl.
G02B 6/02 (2006.01)
G02B 6/32 (2006.01)
G02B 6/36 (2006.01)

(52) U.S. Cl. .................. 385/123; 385/37; 385/125; 385/126; 385/127

(58) Field of Classification Search .................. 385/37, 385/123, 125–127, 141–145
See application file for complete search history.

(56) References Cited

U.S. PATENT DOCUMENTS

| | | | |
|---|---|---|---|
| 4,823,166 A | 4/1989 | Hartog et al. | |
| 4,986,624 A | 1/1991 | Sorin et al. | |
| 5,102,232 A | 4/1992 | Tanabe et al. | |
| 5,774,619 A | 6/1998 | Bruesselbach | |
| 5,825,804 A | 10/1998 | Sai | |
| 6,011,881 A | 1/2000 | Moslehi et al. | |
| 6,052,497 A | 4/2000 | Graebner | |
| 6,104,852 A * | 8/2000 | Kashyap | 385/123 |
| 6,295,304 B1 | 9/2001 | Koch et al. | |
| 6,389,200 B1 | 5/2002 | Foltzer | |
| 6,563,985 B2 | 5/2003 | Yin et al. | |

(Continued)

FOREIGN PATENT DOCUMENTS

WO    WO 01/93466 A2    12/2001

(Continued)

OTHER PUBLICATIONS

U.S. Appl. No. 11/538,954, Dimmick.

(Continued)

*Primary Examiner*—Frank G. Font
*Assistant Examiner*—Michael P. Mooney
(74) *Attorney, Agent, or Firm*—Darby & Darby; Robert J. Sacco

(57) ABSTRACT

An optical fiber (100A-100D) is provided with a cylindrical core (102) and a first optical cladding layer (104). The core (102) is formed of a core material (105) that is optically transmissive. The core material (105) has a core index of refraction that is continuously variable over a predetermined range of values responsive to a first energetic stimulus, such as thermal energy, photonic energy, magnetic field, and an electrical potential. The core (102) includes a bore (103) axially disposed within the first optical cladding layer (104). The bore (103) is filled with the core material (105). The first optical cladding layer (104) is disposed on the core (102). The first optical cladding layer (104) is formed of a photosensitive material. The photosensitive material has a first cladding layer index of refraction that is permanently selectively configurable responsive to an exposure to a second energetic stimulus. The first optical cladding layer (104) has gratings (114-1, 114-2) inscribed therein.

25 Claims, 7 Drawing Sheets

U.S. PATENT DOCUMENTS

| | | |
|---|---|---|
| 6,608,952 B2 | 8/2003 | Eggleton et al. |
| 6,768,839 B2 | 7/2004 | Blomquist et al. |
| 6,804,041 B1 | 10/2004 | Giakos |
| 6,819,845 B2 | 11/2004 | Lee et al. |
| 6,859,567 B2 | 2/2005 | Galstian et al. |
| 6,859,583 B2 | 2/2005 | Lachance et al. |
| 7,027,699 B2 | 4/2006 | Tao et al. |
| 7,224,881 B2 | 5/2007 | Aoki et al. |
| 2004/0151433 A1 | 8/2004 | Galstian et al. |
| 2005/0018945 A1 | 1/2005 | Dunphy et al. |
| 2006/0088267 A1 | 4/2006 | Fukuda et al. |

FOREIGN PATENT DOCUMENTS

| | | |
|---|---|---|
| WO | WO 2004/001357 A1 | 12/2003 |

OTHER PUBLICATIONS

U.S. Appl. No. 11/538,939, Dimmick et al.

* cited by examiner

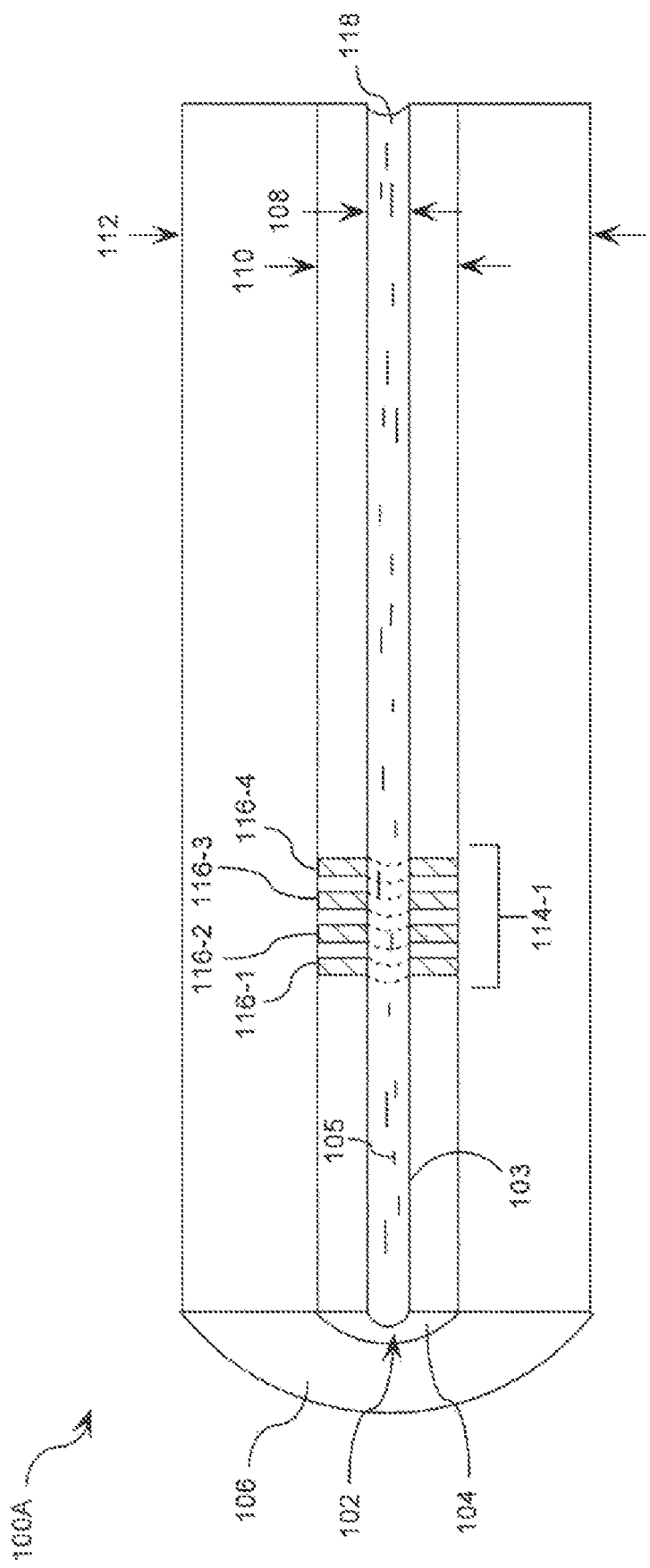

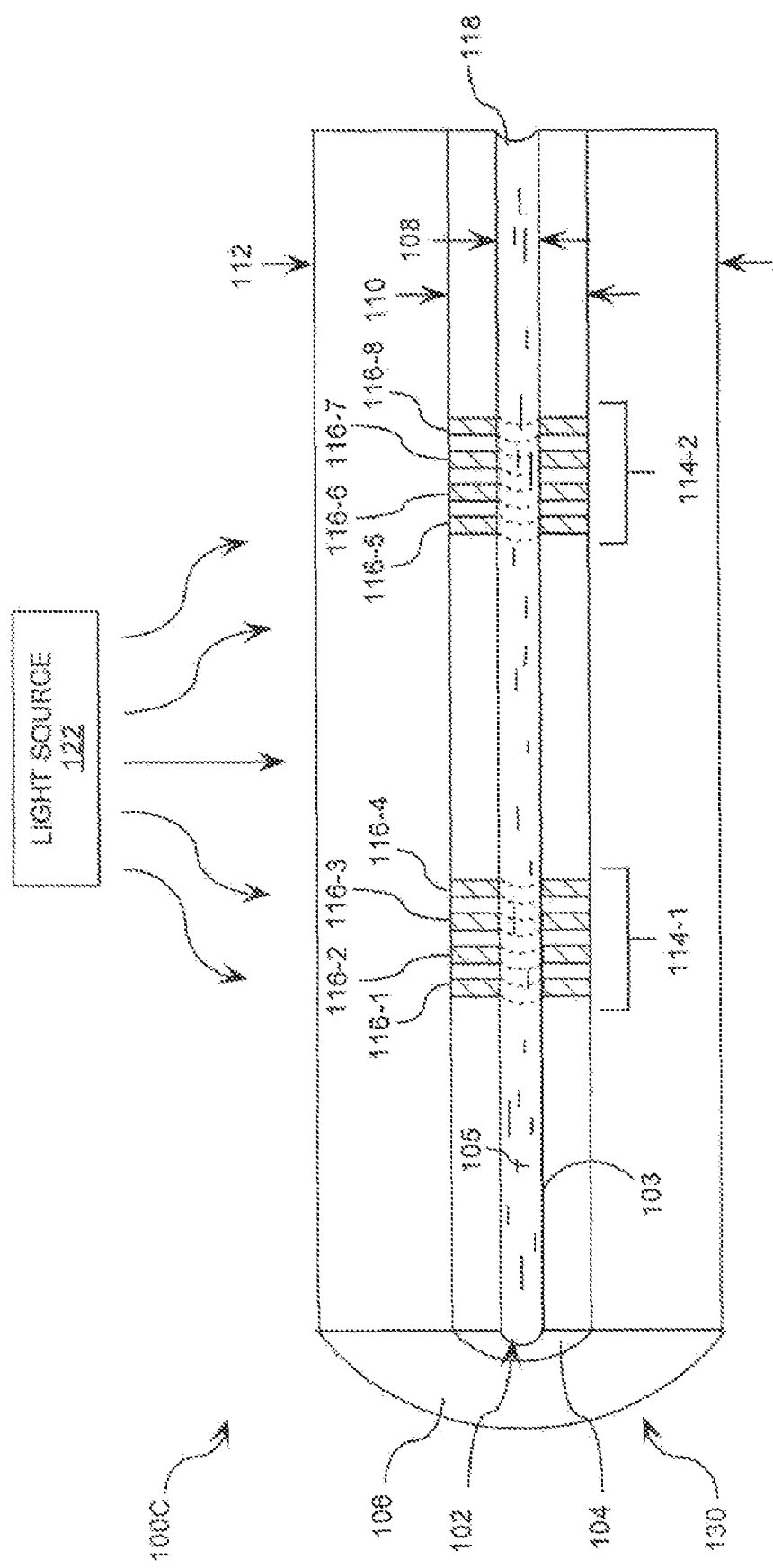

CAPILLARY WAVEGUIDE TUNABLE OPTICAL DEVICE

STATEMENT REGARDING FEDERALLY SPONSORED RESEARCH OR DEVELOPMENT

This invention was made with government support. The government has certain rights in the invention.

BACKGROUND OF THE INVENTION

1. Statement of the Technical Field

The invention concerns fiber optic devices, and more particularly, fiber optic devices having capillary waveguides.

2. Description of the Related Art

Optical fibers are used for data transmission within Dense Wavelength Division Multiplexed (DWDM) based networks. Devices within DWDM based networks transmit a number of signals through a single optical fiber. This is accomplished by transmitting each signal at a different wavelength along the longitudinal axis of the optical fiber. Consequently, DWDM based networks also include devices at a distal end of the optical fiber to filter a signal with a specific wavelength from a set of received signals. Tunable optical bandpass filters are often used for this purpose. In general, it is desirable for these filter devices to provide (1) wide tuning range, (2) negligible cross-talk with adjacent channels, (3) fast tuning speed, (4) low insertion loss, (5) polarization insensitivity and (6) stability with respect to environmental changes.

Various techniques are known for the purpose of implementing optical band pass filters. One such technique makes use of a fiber optic grating system. Fiber optic grating systems filter or scatter particular wavelengths of light communicated down the length of the fiber. Fiber gratings are formed by creating a periodic perturbation of the properties of the fiber. Typically, the periodic perturbation is with respect to the refractive index of the core. For example, a fiber optic grating system can include a core with a specific refractive index that varies along the length of the fiber.

Two basic types of grating systems which are known in the art include long period gratings and short period Bragg gratings. Short period fiber gratings are generally characterized as having a sub-micrometer period. These types of devices operate by coupling light from the forward propagating core mode to a backward propagating core mode. In general, the short period fiber Bragg grating will have selected narrow band reflection of specific wavelengths. Short period grating filters are usually tuned by applying stress to the grating.

In contrast, long period gratings in optical fibers typically have a period in the range of a few tens of micrometers to one (1) millimeter. Such long period gratings promote coupling between propagating core modes and co-propagating cladding modes. Long period gratings generally attenuate a certain wavelength and offer wider bandwidths.

Various techniques have been proposed for tuning optical filters as described herein. For example, special materials have been used to form the cladding material surrounding the optical fiber core. These materials interact with optical energy extending into the cladding. Changing the index of refraction for these cladding materials tunes the frequency response of the device. One example of such a device is an optical fiber with air channels or capillaries in the cladding region of the fiber. The capillaries contain a fluid having a specific index of refraction. A long period grating is inscribed in the core which couples light of certain wavelengths into forward propagating cladding modes. Power at these wavelengths is attenuated. The response of the filter is tuned by moving the fluid into and out of the region where the grating is provided. Changing the position of the fluid in this way has been used to change the attenuation and/or wavelength of the transmission notch.

Other methods for tuning optical filters are also known. For example, a fiber can be physically stressed to modify its frequency response. Acousto-optic tunable filters use flexural waves propagating along a length of the fiber to tune the reflection wavelength of the optical grating. An electro-optic approach can also be used to modify the filter response. In particular, a long period grating can be formed in a core of a specialty fiber. A thin inner cladding of silica can be disposed over the core and an electro-optic outer cladding can be formed over the inner cladding. An applied voltage is used to change the refractive index of the outer cladding. This modification of the index of refraction of the outer cladding tunes the wavelength that is filtered.

SUMMARY OF THE INVENTION

An optical fiber is provided. The optical fiber is an elongated structure that includes a cylindrical core and a first optical cladding layer. The cylindrical core is formed of a core material that is optically transmissive. The core material is a liquid or fluid having an index of refraction that is continuously variable over a predetermined range of values responsive to an energetic stimulus. Such energetic stimulus includes thermal energy, photonic energy, magnetic field, and an electrical potential. The first optical cladding layer is disposed on the core. The first optical cladding layer is formed of a material that has a first cladding layer index of refraction that is permanently selectively configurable responsive to an exposure to an energetic stimulus. Such energetic stimulus include photonic energy, for example ultraviolet (UV) light.

According to a preferred embodiment, the core includes a bore axially disposed within the first optical cladding layer. The bore is filled with the core material, which may be selected as a liquid or a fluid. According to the preferred embodiment of the invention, the core material is a fluid having an index of refraction $n_1$ that is continuously variable over a predetermined range of values responsive to thermal energy. The range of values of the index of refraction is chosen to produce a capillary waveguide that supports a single propagating core mode throughout the desired wavelength tuning range.

According to another aspect of the invention, an optical grating is disposed within the first optical cladding layer. According to one embodiment of the invention, the optical grating is comprised of a portion of the first optical cladding layer which has an index of refraction that is modulated in a periodic pattern along a length of said optical fiber. According to another embodiment of the invention, the periodic pattern is comprised of a sinusoidal variation in a value of the index of refraction. According to yet another embodiment of the invention, the optical grating is an apodized periodic grating or a chirped grating.

According to yet another aspect of the invention, the optical fiber includes a second optical cladding layer. The second optical cladding layer is disposed on the first optical cladding layer. The second optical cladding layer has a second cladding layer index of refraction less than the index of refraction of the core.

BRIEF DESCRIPTION OF THE DRAWINGS

Embodiments will be described with reference to the following drawing figures, in which like numerals represent like items throughout the figures, and in which:

FIG. 1A is a cross-sectional view of an optical fiber that is useful for understanding the invention.

FIG. 1C is cross-sectional view of an optical fiber that is useful for understanding the invention.

DETAILED DESCRIPTION OF THE PREFERRED EMBODIMENTS

Figure 1B:
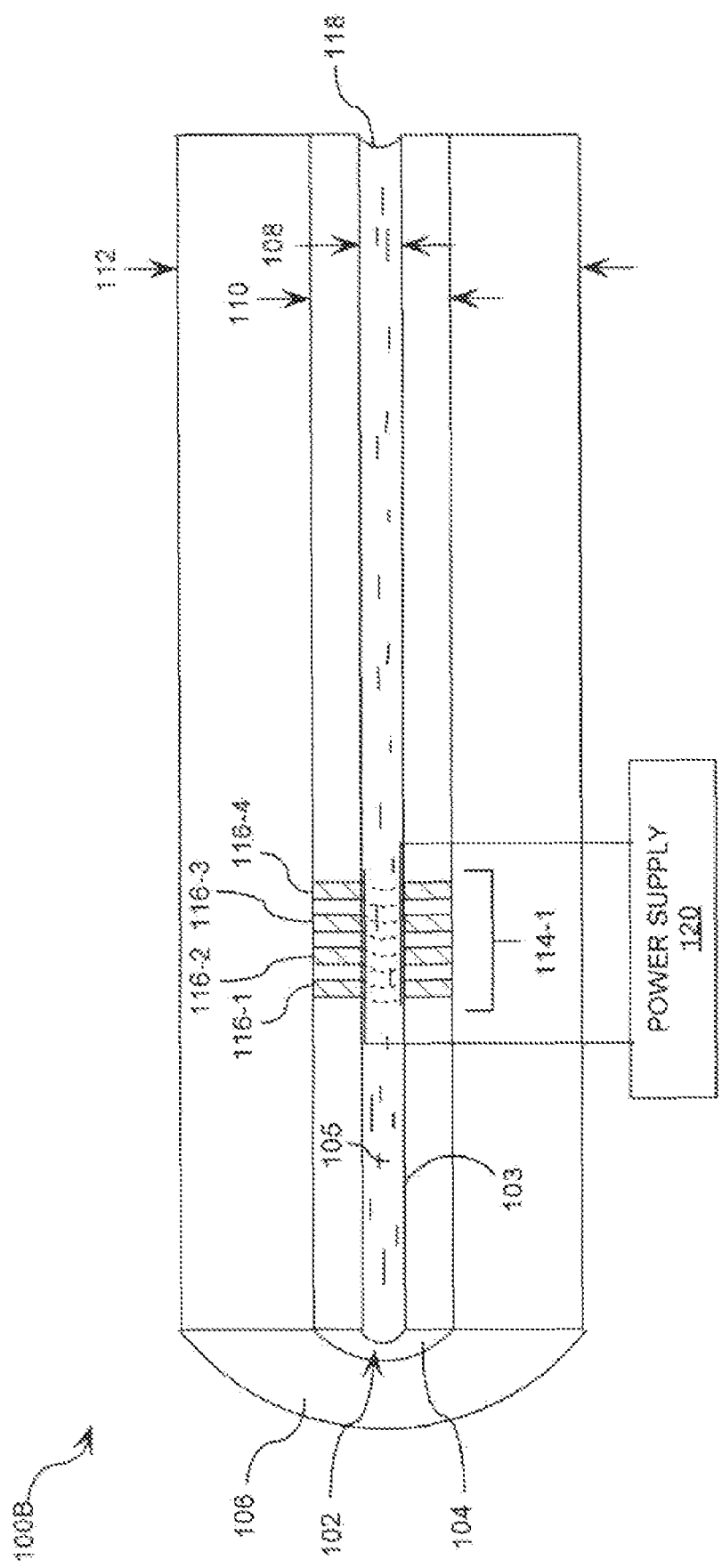
FIG. 1B is cross-sectional view of an optical fiber that is useful for understanding the invention.

FIG. 1A is a cross-sectional view of an optical fiber 100A that is useful for understanding the invention. The optical fiber 100A is an elongated structure comprised of a cylindrical core 102, a first optical cladding layer 104, and a second optical fiber cladding layer 106. The core 102 is comprised of a core material to provide a waveguide for the propagation of a desired optical signal through the optical fiber 100A. Such core materials include any media having an index of refraction and/or optical loss that is highly responsive to an energetic stimulus, such as thermal energy, photonic energy, an electrical potential, and a magnetic field.

According to a preferred embodiment of the invention shown in FIG. 1A the core 102 is comprised of a bore 103 axially disposed within the first optical cladding layer 104. The bore 103 is further filled with a working fluid or liquid 105 having an index of refraction $n_1$ that is continuously variable over a predetermined range of values responsive to thermal energy. With a working fluid 105 disposed within the bore, optical fiber 100A can be viewed as a capillary waveguide. Light can propagate within the core 102 in a manner which will be readily understood by those skilled in the art. The working fluid can be selected with an index of refraction $n_1$ in accordance with a particular optical fiber application. For example, the working fluid is advantageously selected with an index of refraction $n_1$ from 1.4 to 1.8 at room temperature (approximately 25° Celsius). Such working fluids include Series A fluids, Series B fluids, and Series M fluids available from Cargille Labs, Inc., of Cedar Groove, N.J. Still, the invention is not limited in this regard. Any working fluid with an index of refraction $n_1$ that is highly sensitive to thermal energy can be used without limitation.

According to another embodiment of the invention shown in FIG. 1B, the core 102 is comprised of a bore 103 axially disposed within the first optical cladding layer 104. The bore 103 is further filled with an electro-optic working fluid or liquid 105 having an index of refraction $n_1$ that is continuously variable over a predetermined range of values responsive to an electrical potential. As shown in FIG. 1B, the electric potential can be applied with an external power supply 120. The position of the electrodes is advantageously chosen to apply an electric field to the electro-optic working fluid without interfering with the optical transmission. However, the invention is not limited in this regard. Any suitable mechanism known in the art can be used for this purpose. The electro-optic working fluid can be selected with an index of refraction $n_1$ in accordance with a particular optical fiber application. In this regard, the electro-optic working fluid is selected with an index of refraction $n_1$ from 1.4 to 1.8 at room temperature (approximately 25° Celsius). Such electro-optic working fluids include liquid crystals and/or electro-optic polymers. Still, the invention is not limited in this regard. Any electro-optic material with an index of refraction $n_1$ that is highly sensitive to an electrical potential can be used without limitation.

According to yet another embodiment of the invention shown in FIG. 1C, the core 102 is comprised of a bore 103 axially disposed within the first optical cladding layer 104. The bore 103 is further filled with a working fluid or liquid 105 having an index of refraction $n_1$ or an absorption that is continuously variable over a predetermined range of values responsive to photonic energy. As shown in FIG. 1C, the photonic energy can be applied with an external light source 122. It should be appreciated that the external light source 122 can illuminate an optical fiber 100C from the side as shown in FIG. 1C. Alternatively, the external light source 122 can illuminate the optical fiber 100C from an end 130 of the fiber 100C where light is guided by the fiber 100C and propagates with a signal being filtered. However, the invention is not limited in this regard. Any suitable means known in the art can be used for this purpose. The working fluid can be selected with an index of refraction $n_1$ in accordance with a particular optical fiber application. In this regard, the working fluid is selected with an index of refraction $n_1$ from 1.4 to 1.8 at room temperature (approximately 25° Celsius). Such working fluids include doped fluids or fluids exhibiting a Kerr nonlinearly. Still, the invention is not limited in this regard. Any working fluid with an index of refraction $n_1$ or absorption that is highly sensitive to photonic energy can be used without limitation.

Figure 1D:
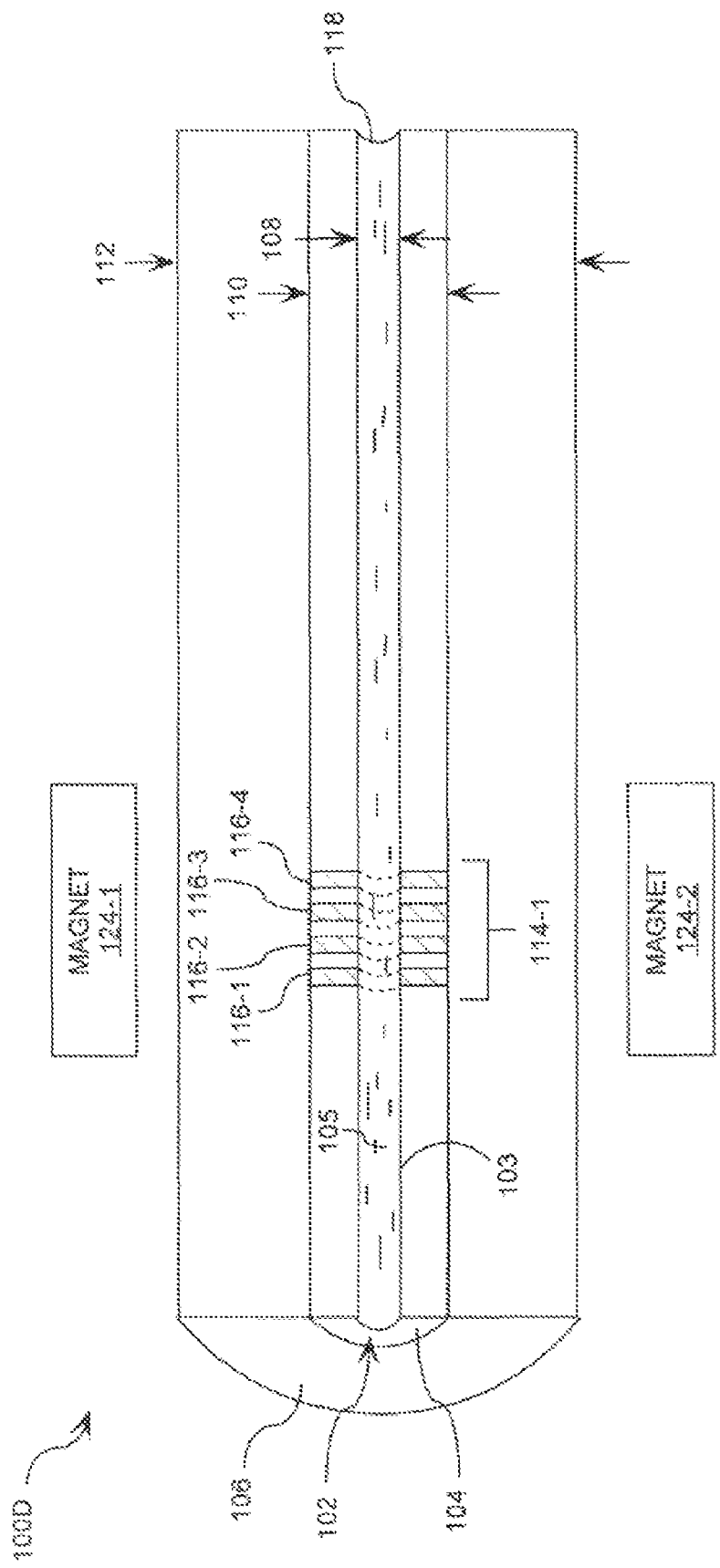
FIG. 1D is cross-sectional view of an optical fiber that is useful for understanding the invention.

According to another embodiment of the invention shown in FIG. 1D, the core 102 is comprised of a bore 103 axially disposed within the first optical cladding layer 104. The bore 103 is further filled with a working fluid or liquid 105 having an index of refraction $n_1$ that is continuously variable over a predetermined range of values responsive to a magnetic field. As shown in FIG. 1D, the magnetic field can be applied with one or more external magnets 124-1, 124-2. However, the invention is not limited in this regard. Any suitable mechanism known in the art can be used for this purpose. The working fluid can be selected with an index of refraction $n_1$ in accordance with a particular optical fiber application. For example, the working fluid is advantageously selected with an index of refraction $n_1$ from 1.4 to 1.8 at room temperature (approximately 25° Celsius). Still, the invention is not limited in this regard. Any working fluid with an index of refraction $n_1$ that is variable in response to a magnetic field can be used without limitation.

Referring again to FIGS. 1A-1D it can be observed that the core 102 has a diameter 108. The diameter 108 can be selected in accordance with a particular optical fiber application. It should be appreciated that the number of desired resonant modes will generally tend to dictate the sizing of the core 102. For example, in the preferred embodiment of the present invention, the core 102 has a diameter 108 chosen to produce a capillary waveguide that supports a single propagating core mode throughout the desired wavelength tuning range. The core diameter is also advantageously selected to optimize the optical fiber's sensitivity to an energetic stimulus, such as thermal energy, photonic energy, magnetic field, and electrical potential. It should be understood that the core diameter 108 together with the index of refraction of the core and cladding materials determines the fraction of light carried in the optical fiber 100A-100D that overlaps with the core material. In this regard, it should be further understood that the larger the core diameter the larger the fraction of light that is present in the core and the larger the sensitivity to an energetic stimulus.

The first optical cladding layer 104 is disposed on the core 102. The first optical cladding layer 104 is formed of a material that has a first cladding layer index of refraction that is permanently selectively configurable responsive to an exposure to an energetic stimulus, such as photonic energy. Such materials include a glass (for example, a silica glass, a fluorozirconate glass, a fluoroaluminate glass, and a chalcogenide glass) doped with photosensitive chemical elements, a polymer doped with photosensitive chemical elements, and/or an electro-optic material doped with photosensitive chemical elements. According to a preferred embodiment of the invention, the material is selected as silica glass doped with germanium to provide ultraviolet (UV) light photosensitivity and fluorine to lower its index of refraction slightly below that of the second optical cladding layer 106. Still, the invention is not limited in this regard. Any suitable material may be used to form the first optical cladding layer 104 without limitation provided that it is sensitive to an energetic stimulus. However, it should be understood that the material used to form the first optical cladding layer 104 is selected with an index of refraction $n_2$ in accordance with a particular filtering operation. For example, the material is selected with an index of refraction $n_2$ less than the index of refraction $n_1$ of the core 102. Such an architecture provides an optical fiber with a guided mode that is substantially confined to the fluid or liquid filled core 102 and the region of the first optical cladding layer 104 nearest to the core 102.

One or more optical gratings are advantageously formed on the optical fiber 100A-100D. In FIGS. 1A, 1B and 1D, a single grating 114-1 is shown. In FIG. 1C, an optical fiber with two gratings 114-1, 114-2 is shown. Optical gratings 114-1, 114-2 are inscribed around inner surface 118 in the first optical cladding layer 104 using any fabrication technique known in the art. Such techniques include a photo-inscribing technique using an ultraviolet laser and/or any other inscribing technique known in the art. In a preferred embodiment, ultraviolet light is used to create the gratings. An ultraviolet laser is positioned external to the fiber. The laser illuminates the fiber through a phase mask formed from a slab of silica in which there is a pattern of fine parallel grooves or troughs. The phase mask diffracts the light, thereby generating an interference pattern. The result is regions of high and low intensity UV light, which alternates along the length of the fiber in the region where the grating is to be formed. The extent to which the index of refraction varies as a result of this process will depend on several factors. For example, these factors can include the composition of the first optical cladding layer, and the exposure time and intensity of the ultraviolet light.

According to an embodiment of the invention, the optical gratings 114-1, 114-2 are inscribed around inner surface 118 in the first optical cladding layer 104 such that the optical gratings 114-1, 114-2 are axially disposed about the core 102. This configuration results in a periodically varying refractive index $n_2$ of the first optical cladding layer 104 along its longitudinal axis. Still, the invention is not limited in this regard. The optical gratings 114-1, 114-2 can be inscribed in the first cladding layer 104 in a chirped manner. This configuration results in optical gratings 114-1, 114-2 having a grating period that varies along its longitudinal axis. The optical gratings 114-1, 114-2 can also be inscribed in a manner such that the optical gratings 114-1, 114-2 are apodized periodic gratings.

Each optical grating 114-1, 114-2 can be designed so that an index of refraction of the first optical cladding layer is modulated or varies in a periodic manner along a portion of the length of the optical fiber. For convenience, this periodic variation is illustrated in FIGS. 1A-1D as a series of alternating ring-like structures 116-1, 116-2, 116-3, 116-4, 116-5, 116-6, 116-7, 116-8. However, it should be understood that the actual periodic variation of the index of refraction in the first optical cladding layer does not typically vary in such an abrupt manner. Instead, the index of refraction is varied in a more continuous way. For example, in the embodiment shown, the value of the index of refraction is preferably varied in a sinusoidal manner. The amplitude of the variation in the index of refraction can be constant along the length of the optical grating or it can be modulated along the length of the optical grating. It is well known in the art that by modulating the amplitude of the variations in the index of refraction along the length of a grating, it is possible to achieve various different effects upon optical energy communicated along the length of an optical fiber. Any of these well known amplitude modulation techniques can be used with the present invention.

In FIGS. 1A, 1B, and 1D, the optical fiber 100A, 100B, 100D may be configured as a tunable notch filter that couples light between a forward propagating core mode and a backward propagating core mode exhibiting a transmission minimum at a wavelength $\lambda_B$ (the Bragg wavelength) by selecting a grating period ($\Lambda_{grating}$) using Equation (1):

$$\Lambda_{grating} = \lambda_B / (2 \times n_{eff}) \tag{1}$$

where $n_{eff}$ is an effective index of refraction of the mode guided by the core 102 of the optical fiber 100A, 100B, 100D. In a fluid filled capillary as provided in FIGS. 1A-1D, the Bragg wavelength will change as a function of the index of refraction of the fluid because the effective index of refraction is dependent in part on the index of refraction of the fluid. If the index of refraction of the fluid can be varied by the application of an energetic stimulus (e.g., thermal energy), the Bragg wavelength or notch wavelength can be selectively controlled in this way.

Coupled-mode theory (CMT) can be used to model the spectral response of the gratings 114-1, 114-2 shown in FIGS. 1A-1D. In general, CMT shows that the grating strength, as well as the overlap of the mode field of the guided mode with the grating perturbation will determine the bandwidth and depth (attenuation) of the notch in the transmission spectrum. It should be appreciated that the optical gratings 114-1, 114-2 interact with light waves propagating along the longitudinal axis of optical fiber 100A-100D. This interaction depends on the grating period of each optical grating 114-1, 114-2. For example, each optical grating 114-1, 114-2 has a short grating period. The interaction between these optical gratings 114-1, 114-2 and light waves guided by the core 102 causes light waves of certain wavelengths to couple to a backward propagating core mode. In an alternate aspect of the invention, each optical grating 114-1, 114-2 has a long grating period. The interaction between these optical gratings 114-1, 114-2 and light waves guided by the core 102 causes light waves of certain wavelengths to couple to forward propagating cladding modes.

Still referring to FIG. 1A the first optical cladding layer 104 has a diameter 110. The diameter 110 can be selected in accordance with a particular optical fiber 100A application. According to a preferred aspect of the invention, the first optical cladding layer 104 advantageously has a diameter 110 that optimizes the interaction of the light propagating in the guided mode with the optical grating 114-1, 114-2 and the core material occupying the bore 103. However, the invention is not limited in this regard. Any suitable diameter 110 can be used in accordance with particular filtering applications.

The second optical cladding layer 106 is disposed on first optical cladding layer 104. The second optical cladding layer 106 is comprised of dielectric material with a refractive index $n_3$. Such materials include fused silica and/or fused quartz. According to a preferred aspect of the invention, the material forming the second optical cladding layer 106 is selected with a refractive index $n_3$ less than the refractive index $n_1$ of the fluid occupying core 102. It should be appreciated that the refractive index $n_3$ could be less than or greater than the refractive index $n_2$ of the first optical cladding layer 104. However, the refractive index $n_3$ must be less than the refractive index $n_1$ of the fluid occupying core 102.

As shown in FIG. 1A the second optical cladding layer 106 has a diameter 112. The diameter 112 can be selected in accordance with a particular optical fiber 100A application. According to a preferred aspect of the invention, the second optical cladding layer 106 has a diameter 112 equal to 125 micrometers. Such a diameter 112 provides for compatibility with standard 125 micrometer diameter optical fibers and associated components and tooling. The diameter 112 also provides for a plurality of cladding modes (i.e., allowing multiple resonant bands over the infrared spectrum). However, the invention is not limited in this regard. Any suitable diameter 112 can be used in accordance with particular filtering applications and may be advantageously chosen to select certain cladding modes with which a resonant interaction is desired.

Although a protection layer is not shown in FIG. 1A a person skilled in the art will appreciate that a protection layer can be disposed on the second optical cladding layer 106 for protecting the second optical cladding layer 106 from damage due to environmental conditions and external forces. The protection layer can be comprised of a polymer coating or any other coating known in the art.

A person skilled in the art will further appreciate that the optical fiber 100A-100D can be used in many DWDM based network applications. For example, the optical fiber 100A-100D is implemented in a tunable optical filter for filtering a signal with a specific wavelength from a set of optical signals propagating along the optical fiber.

A person skilled in the art will appreciate that the optical fiber architectures in FIGS. 1A-1D are representative embodiments of an optical fiber architecture. However, the invention is not limited in this regard and any other optical fiber architecture can be used without limitation. For example, in an alternate embodiment of the invention, the optical fiber 100A-100D can be designed exclusive of a second optical cladding layer 106. In such a scenario, the first optical cladding layer 104 can be designed as a rather thick layer (for example, 125 micrometers) encompassing the fluid or liquid filled core 102. In such a scenario, a protection layer can be disposed on the first optical cladding layer 104.

Figure 2:
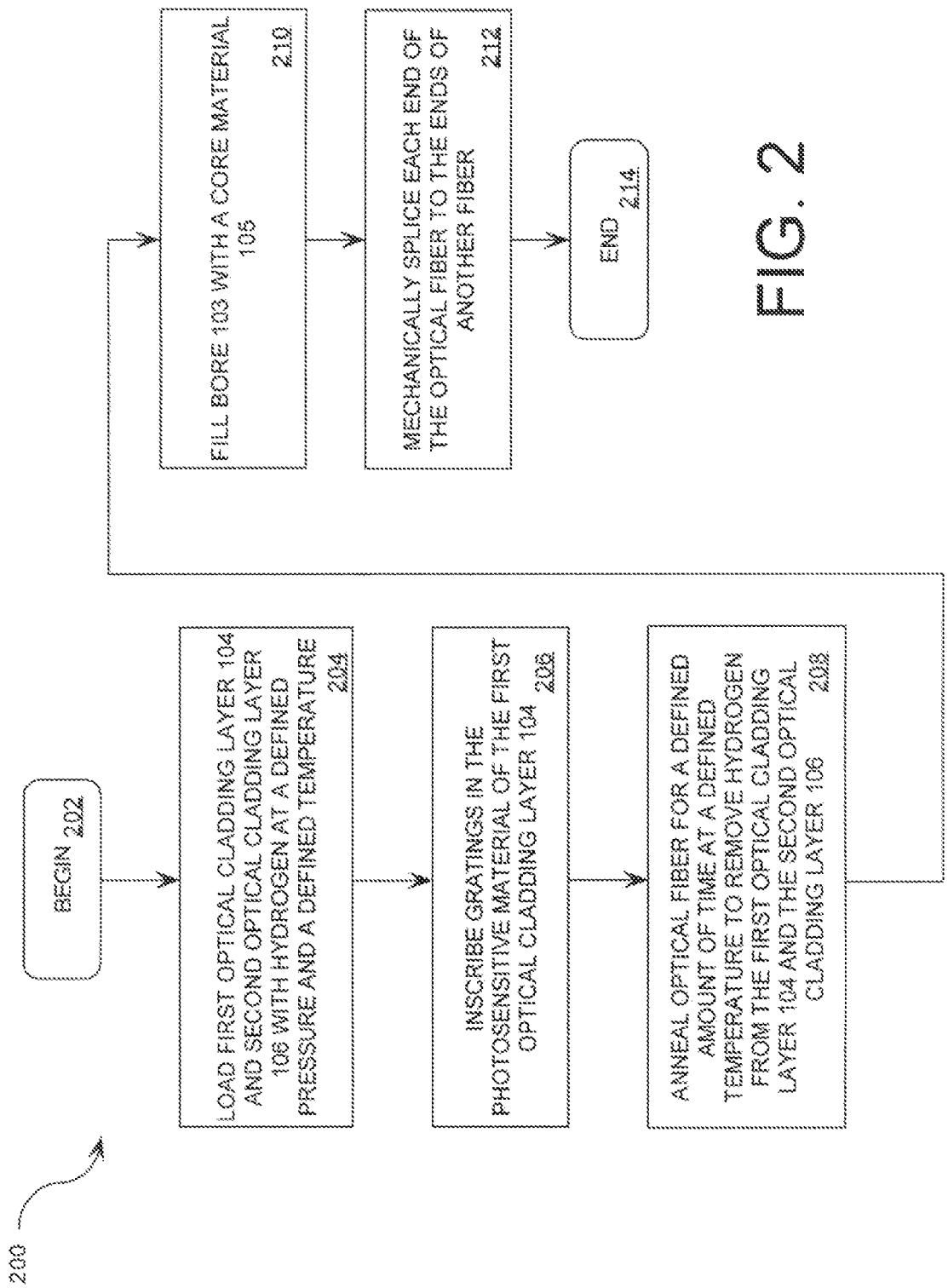
FIG. 2 is a flow diagram of a fabrication process for an optical fiber that is useful for understanding the invention.

FIG. 2 is a flow diagram of a fabrication process for the optical fiber 100A-100D. According to the preferred embodiment of the invention, the fabrication process 200 begins with step 202 and continues with step 204. In step 204, an optical fiber 100A-100D having a bore 103, a first optical cladding layer 104, and a second optical cladding layer 106 is sensitized by loading the optical fiber 100A-100D with a gas such as hydrogen or deuterium with a gas absorption method at a defined pressure (for example, 69 MegaPascal) and a defined temperature (for example, 75° Celsius). Gas absorption methods are well known in the art. Thus, such methods will not be described in great detail herein. Treating the fiber with hydrogen or deuterium before exposing it to ultraviolet light can increase the light sensitivity of the material with regard to modifying the refractive index of the first optical cladding layer 104 to inscribe the optical grating 114-1, 114-2.

After loading the first optical cladding layer 104 and the second optical cladding layer 106 with hydrogen, control passes to step 206. In step 206, at least one short and/or long period grating is inscribed in the first optical cladding layer 104. This step may be accomplished by any method known to a person skilled in the art. For example, the method involves side exposing the first optical cladding layer 104 behind a phase mask with light of a certain wavelength (for example, 244 nanometer). This process is performed for a given amount of time (for example, 650 seconds) and a given total fluence (for example, 260 kiloJoule/centimeter$^2$).

In step 208, the optical fiber is annealed at a given temperature (for example, 50° Celsius) for a defined amount of time. This step is performed to remove the excess hydrogen and to achieve a stable grating strength over the life of the optical fiber.

In step 210, the bore 103 is filled with a core material 105 having a defined index of refraction (for example, n=1.5) that changes with an energetic stimulus, such as thermal energy, photonic energy, magnetic field, and electrical potential. This step involves placing a first end of the optical fiber into a pressurized reservoir filled with the core material. A second end of the optical fiber is open to ambient air. After step 210 is complete, control passes to step 212 where the first end and the second end of the optical fiber are mechanically spliced to the ends of another optical fiber (for example, a Corning SMF-28® fiber). After this step, control passes to step 214 where the fabrication process 200 ends.

A person skilled in the art will appreciate that fabrication process 200 includes only the major steps of fabricating optical fiber 100A-100D. In this regard, fabrication process 200 is simply one embodiment of a fabrication process. The invention is not limited in this regard and any other fabrication process can be used without limitation.

Figure 4:
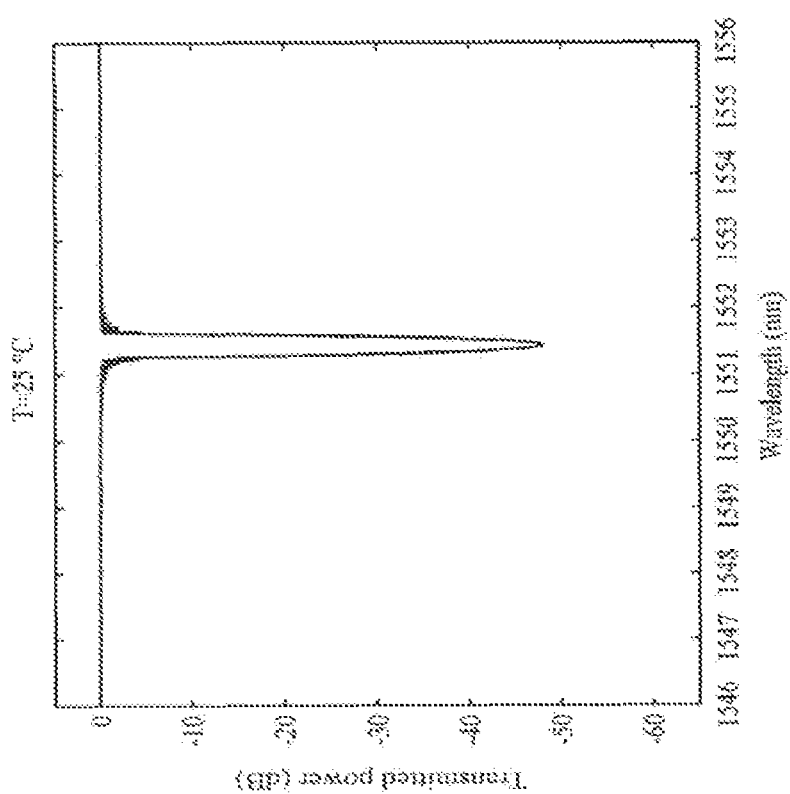
FIG. 4 is a graph illustrating a calculated transmission spectrum for an optical filter including an optical fiber with a core material at a second temperature that is useful for understanding the invention.
Figure 3:
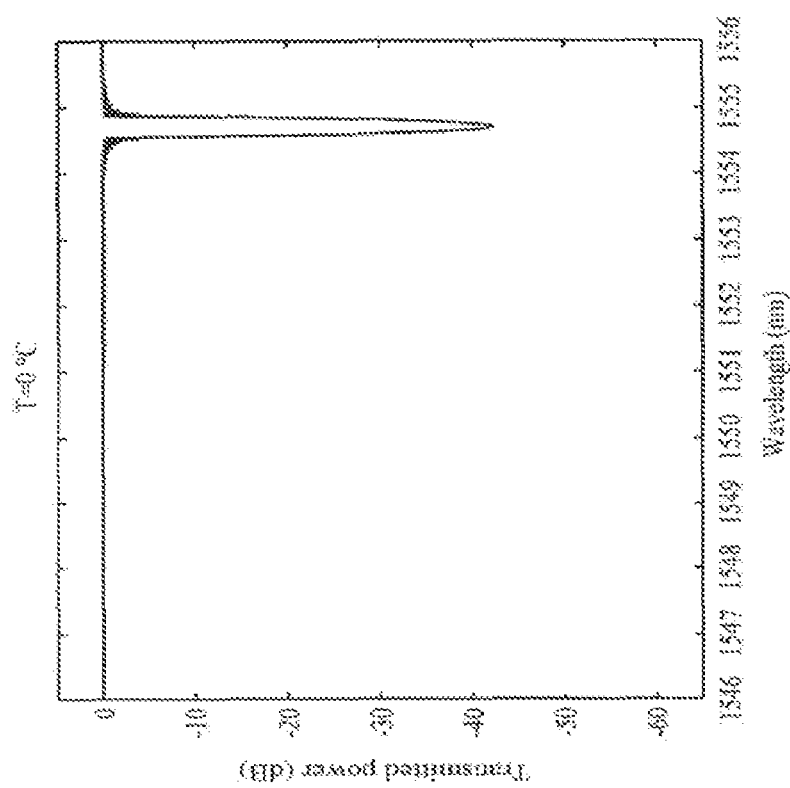
FIG. 3 is a graph illustrating a calculated transmission spectrum for an optical filter including an optical fiber with a core material at a first temperature that is useful for understanding the invention.
Figure 6:
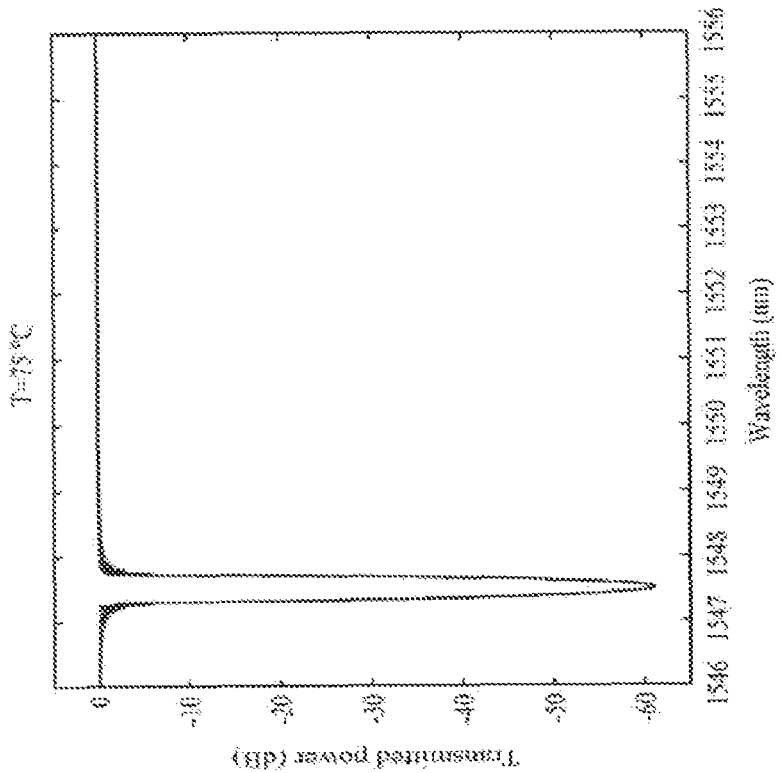
FIG. 6 is a graph illustrating a calculated transmission spectrum for an optical filter including an optical fiber with a core material at a fourth temperature that is useful for understanding the invention.
Figure 5:
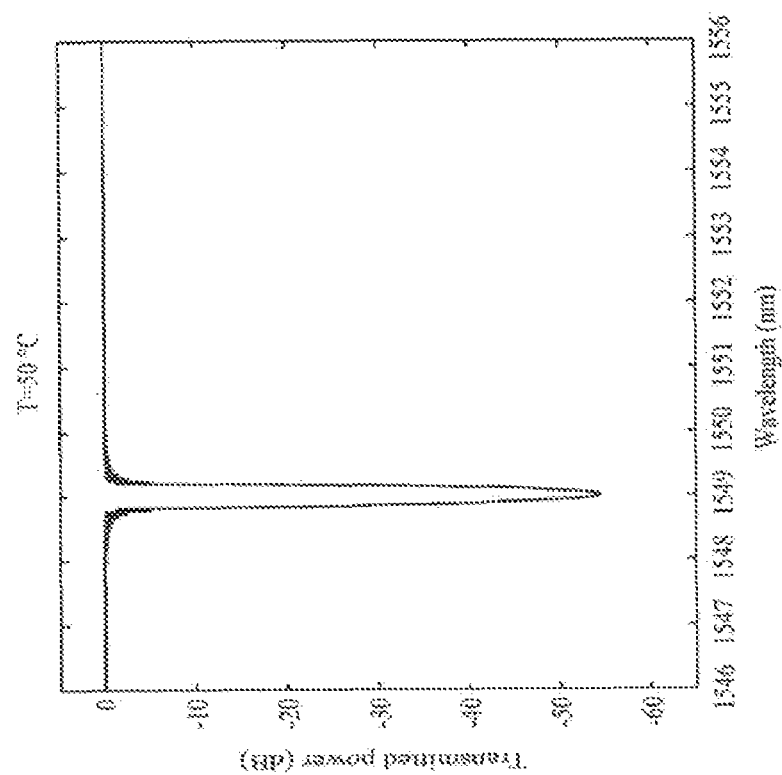
FIG. 5 is a graph illustrating a calculated transmission spectrum for an optical filter including an optical fiber with a core material at a third temperature that is useful for understanding the invention.

Referring now to FIGS. 3 through 6, there are provided a number of graphs illustrating calculated transmission spectra for an optical fiber 100A at a plurality of core material temperatures that is useful for understanding the invention. The mathematical model used to calculate transmission spectra assumed a structure such as would be produced by fabrication process 200, described above (in relation to FIG. 2). The optical filter has the following parameters: core material refractive index $n_1=1.5$ (at a temperature of 25° Celsius), core material refractive index temperature sensitivity $dn^1/dT = -4.01 \times 10^{-4}$ (Celsius°)$^{-1}$, core diameter $d_1=1.4$ micrometers, first optical cladding layer refractive index $n_2=1.444$, first optical cladding layer diameter $d_2=40$ micrometers, second optical cladding layer refractive index $n_3=1.444$, grating period $\Lambda_{grating}=535.28$ nanometers, and grating length $L_1=1$ centimeter. FIG. 3 shows the calculated transmission spectrum for the optical filter with a core material at a first temperature of 0° Celsius. Similarly, FIGS. 4 through 6 show the calculated transmission spectra for the optical filter with a core material at different temperatures selected from the group consisting of 25° Celsius, 50° Celsius, and 75° Celsius, respectively.

As shown in FIGS. 3 through 6, the temperature characteristics of the core material determine the transmission spectrum of the optical filter. The notch wavelength of the optical filter can be tuned by varying a temperature of the core material occupying bore 103.

A person skilled in the art will also appreciate that the optical filter can be designed to operate at different bands (for example, a C-band 1530 nanometer to 1565 nanometer and the L-Band 1565 nanometer to 1625 nanometer) in the near infrared region of the electromagnetic spectrum. For example, an effective index of a guided mode equals 1.45. A grating period equals 535.28 nanometer. Here, a resonant wavelength is equal to 1552.3 nanometer ($\lambda_B=2\times1.45\times535.28$; see Equation (1) above) which resides in the C-band near infrared region of the electromagnetic spectrum. Alternatively, an effective index of a guided mode equals 1.5. A grating period equals 535.28 nanometer. Here, a resonant wavelength is equal to 1605.8 nanometer ($\lambda_B=2\times1.5\times535.28$; see Equation (1) above) which resides in the L-band near infrared region of the electromagnetic spectrum. In view of the forgoing, it should be appreciated that the refractive index of a core material, the refractive index of a first optical cladding layer 104, the refractive index of a second optical cladding layer 106 (provided the first optical cladding layer 104 is thin), the diameter 108 of bore 103, the diameter 110 of the first optical cladding layer 104, the diameter 112 of the second optical cladding layer 106, and a grating period dictate the near infrared band in which the optical filter operates.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. An optical fiber, comprising:
   a cylindrical core formed of a core material that is optically transmissive, said core material having a core index of refraction that is continuously variable over a predetermined range of values responsive to a first energetic stimulus;
   a first optical cladding layer disposed on the core, said first optical cladding layer formed of a material that has a first cladding layer index of refraction that is permanently selectively configurable responsive to an exposure to a second energetic stimulus; and
   a second optical cladding layer disposed on said first optical cladding layer, said second optical cladding layer having a second cladding layer index of refraction that is greater than said first cladding layer index of refraction.

2. The optical fiber according to claim 1, wherein said core material is a fluid.

3. The optical fiber according to claim 1, wherein said core material is a liquid.

4. The optical fiber according to claim 1, further comprising a bore axially disposed within said first optical cladding layer.

5. The optical fiber according to claim 1, wherein said first energetic stimulus is selected from the group consisting of thermal energy, photonic energy, magnetic field, and an electrical potential.

6. The optical fiber according to claim 1, wherein said second energetic stimulus is photonic energy.

7. The optical fiber according to claim 6, wherein said photonic energy is ultraviolet light.

8. The optical fiber according to claim 1, further comprising an optical grating disposed within said first optical cladding layer.

9. The optical fiber according to claim 8, wherein said optical grating is comprised of a portion of said first optical cladding layer which has an index of refraction that is modulated in a periodic pattern along a length of said optical fiber.

10. The optical fiber according to claim 9, wherein said periodic pattern is comprised of a sinusoidal variation in said index of refraction.

11. The optical fiber according to claim 8, wherein said optical grating is an apodized grating.

12. The optical fiber according to claim 8, wherein said optical grating is a chirped grating.

13. The optical fiber according to claim 8, wherein the amplitude of said optical grating is modulated along a length of said optical grating.

14. The optical fiber according to claim 1, wherein said core material is a fluid having an index of refraction between 1.40 and 1.80 at room temperature.

15. The optical fiber according to claim 1, wherein said core material is a liquid crystal.

16. The optical fiber according to claim 1, wherein said core material is an electro-optic polymer.

17. An optical fiber, comprising:
   a cylindrical core formed of a core material that is optically transmissive, said core material having a core index of refraction;
   a first optical cladding layer disposed on the core, said first optical cladding layer formed of a material that has a first cladding layer index of refraction that is permanently selectively configurable responsive to an exposure to an energetic stimulus; and
   a second optical cladding layer disposed on said first optical cladding layer, said second optical cladding layer having a second cladding layer index of refraction that is greater than said first cladding layer index of refraction.

18. The optical fiber according to claim 17, wherein said energetic stimulus is photonic energy.

19. The optical fiber according to claim 18, wherein said photonic energy is ultraviolet light.

20. An optical fiber, comprising:
   a cylindrical core formed of a core material that is optically transmissive, said core material having a core index of refraction that is continuously variable over a predetermined range of values responsive to a first energetic stimulus;
   a first optical cladding layer disposed on the core, said first optical cladding layer formed of a material that has a first cladding layer index of refraction;
   an optical grating disposed within said first optical cladding layer; and
   a second optical cladding layer disposed on said first optical cladding layer, said second optical cladding layer having a second cladding layer index of refraction that is greater than said first cladding layer index of refraction.

21. The optical fiber according to claim 20, wherein said first energetic stimulus is selected from the group consisting of thermal energy, photonic energy, magnetic field, and an electrical potential.

22. The optical fiber according to claim 20, wherein said optical grating is comprised of a portion of said first optical cladding layer which has an index of refraction that is modulated in a periodic pattern along a length of said optical fiber.

23. The optical fiber according to claim 22, wherein said periodic pattern is comprised of a sinusoidal variation in a value of said index of refraction.

24. The optical fiber according to claim 20, wherein said optical grating is an apodized periodic grating.

25. The optical fiber according to claim 20, wherein said optical grating is a chirped grating.

* * * * *